J. HOWELL AND A. W. BROWN.
MEANS FOR GAUGING THE DISTANCE BETWEEN THE KNIFE EDGES OR PIVOTS OF LEVERS.
APPLICATION FILED OCT. 7, 1919.
1,405,218.  Patented Jan. 31, 1922.
FIG. 1
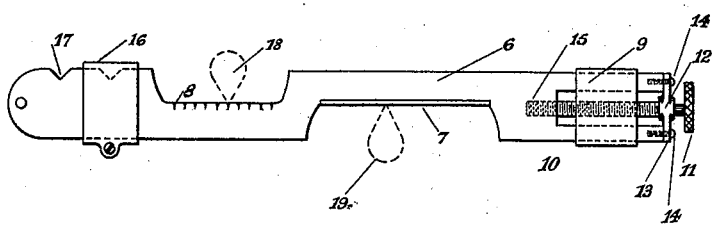
FIG. 2
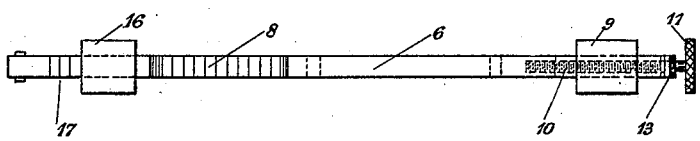
FIG. 3  FIG. 5
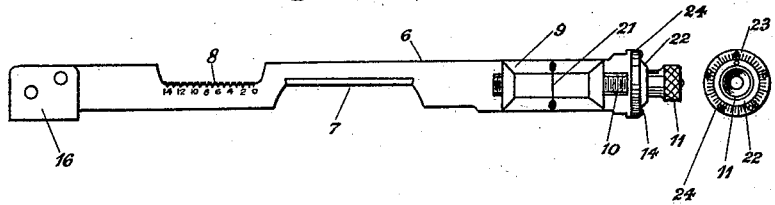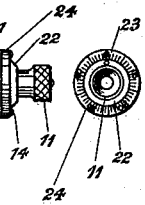
FIG. 4
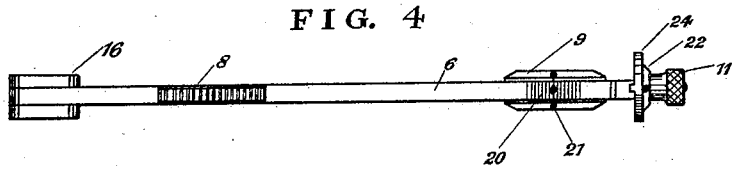
WITNESSES:
Norman S. Barlow
Doris M. Heatley
INVENTORS:
JOHN HOWELL &
ALFRED WILLIAM BROWN.
By George E. Folkes.
ATTORNEY.

UNITED STATES PATENT OFFICE.

JOHN HOWELL, OF MANCHESTER, AND ALFRED WILLIAM BROWN, OF BIRMINGHAM, ENGLAND, ASSIGNORS TO W. & T. AVERY, LIMITED, OF BIRMINGHAM, ENGLAND.

MEANS FOR GAUGING THE DISTANCE BETWEEN THE KNIFE-EDGES OR PIVOTS OF LEVERS.

1,405,218.          Specification of Letters Patent.     Patented Jan. 31, 1922.

Application filed October 7, 1919. Serial No. 329,086.

*To all whom it may concern:*

Be it known that we, JOHN HOWELL and ALFRED WILLIAM BROWN, both subjects of the King of Great Britain, residing, respectively, at 26 Cathedral Street, Manchester, and Soho Foundry, Birmingham, England, have invented a new and useful Means for Gauging the Distance Between the Knife-Edges or Pivots of Levers; and we do hereby declare the following to be a full, clear, and exact description of the same.

This invention has reference to means for gauging the distance between the knife-edges or pivots of a steelyard, weighbeam, or other lever and has for its object to provide an instrument which can be readily applied to the steelyard or other lever to determine whether the protruding knife-edges or pivots on one side of the steelyard or lever are the same distance apart as the corresponding knife-edges or pivots on the opposite side of the steelyard or lever, and consequently whether one pair of oppositely projecting knife-edges or pivots is parallel to another pair.

By means of a gauge constructed and applied according to this invention we dispense with the ordinary methods of gauging which now obtain the best of which are liable to certain inaccuracies and we substitute a gauge which may be said to automatically determine whether the knife-edges or pivots upon one side of the steelyard or lever accurately correspond with the knife-edges on the other side of the steelyard, the use of this guage ensuring a greater degree of accuracy in the construction and testing of the knife-edge centres or pivots of a steelyard or lever than has hitherto been possible.

The invention comprises a gauge for determining the distance between the knife-edges or pivots of a steelyard, weighbeam, or other lever, and consists of a beam having two oppositely disposed bearing faces adapted to be brought into contact with the two knife-edges or pivots of the steelyard or the like, said beam being provided with a traversable weight by means of which the balance of the beam about one of the said knife-edges or pivots may be obtained, and when so balanced as will be hereinafter more fully described the gauge is transferred to the opposite side of the steelyard or the like to determine whether the knife-edges or pivots to which the gauge is applied are the same distance apart as the corresponding knife-edges on the opposite side, the said gauge being preferably provided with means whereby a measurement of any inaccuracy can be ascertained by means of a suitable scale.

The invention will now be described in conjunction with the accompanying drawings which illustrate two constructions of gauge adapted for use with the knife-edges of a steelyard or like lever, but we desire it to be understood that various modifications may be made in the shape and construction of the gauge to suit different shaped levers, for example the beam comprising the main member of the gauge may be cranked instead of being shaped as shown in the accompanying drawings.

In the drawings:—

Figure 1 is a side elevation of the gauge showing its method of application to the knife-edges of a steelyard or like lever.

Fig. 2 is a plan of the gauge seen in Fig. 1.

Fig. 3 is a side elevation of a modified construction of gauge.

Fig. 4 is a plan of Fig. 3, and

Fig. 5 is an end elevation of Fig. 3.

The simple form of gauge seen in Figs. 1 and 2 will first be described. The gauge comprises a beam 6 which has formed in its length two oppositely disposed bearing faces 7 and 8 one of these faces (7) being plain and the other (8) being notched, the face line of both of these faces being located in the same horizontal plane. At one end of the beam is mounted a weight or nut 9 adapted to be traversed along the beam for the purpose of balancing the beam as will be hereinafter described with reference to the method of employment of the gauge. The said weight or nut 9 is mounted upon a screw 10 which is rotated by means of a milled head 11, the screw having bearing in the boss 12 forming part of the end plate 13 which is secured to the beam 6 by means of screws 14, the screw 10 also engaging within the hole 15 in the body of the beam 6. The other end of the beam 6 is provided with a balance weight 16 which is mounted in the left hand end of the beam, this weight can be alternatively positioned in the V notch 17 to vary the initial balance of the beam if necessary. The knife-edges 18 and 19 indicated in Fig. 1 are presumed to indicate the fulcrum and back centre knife-edges of the steelyard or lever which is to be gauged.

Referring now more particularly to Figs. 3 to 5 of the accompanying drawings. Corresponding parts of the gauge are indicated by similar reference numerals to those referred to with reference to Figs. 1 and 2, but in addition to the features of the gauge as depicted in Figs. 1 and 2 the gauge as seen in Figs. 3 to 5 is provided with a scale whereby a measurement of any inaccuracy may be ascertained. Arranged conjunctively with the screw 10 is a scale 20 against which scale the zero graduation 21 upon the weight or nut 9 is indicated, the graduated scale 20 being engraved upon the beam 6. Arranged conjunctively with the screw 10 and the graduated scale 20 is a vernier scale whereby subdivisions of the main divisions (20) are obtained, the subdivisions are indicated by the position of the circular vernier disc 22 mounted on the screw 10 operating in conjunction with the scale of graduations 23 on the circular disc 24 secured to the right hand end of the beam 6. The graduations upon the vernier scale are so arranged that one rotation of the screw 10, that is, of the disc 22, is equivalent to a traversing movement of the weight or nut 9 from one graduation of the scale 20 to the next graduation of the scale 20 along the beam 6. By means of the said improvement we are enabled to ascertain the amount of any inaccuracy in terms of linear measurement by a direct reading from the scale or scales forming part of the improved gauge.

The method of employment of the gauge will now be described. The gauge is first applied to the fulcrum and back centre knife-edges (indicated at 18 and 19 Fig. 1) projecting from one side of the back end of the steelyard or like lever, the gauge being balanced by means of the adjustment of the weight or nut 9 so that it will swing or be in equilibrium upon the load knife-edge 19, the plain bearing surface 7 being in contact with the said knife-edge. The notched face 8 of the gauge is now brought into engagement with the fulcrum knife-edge 18 and if this knife-edge does not enter one of the notches in this face the gauge is moved longitudinally along the load knife-edge 19 until the closest notch is brought into engagement with the fulcrum knife-edge 18, this longitudinal motion has disturbed the balance of the gauge upon the load knife-edge 19 and the balance is re-established by traversing the weight or nut 9 along the beam, by a rotation of the screw 10. The gauge in the now re-balanced position is removed from the knife-edges on the one side of the steelyard or other lever and brought into engagement with the same or corresponding knife-edges protruding from the opposite side of the steelyard or other lever, the fulcrum knife-edge 18 being located in the same notch as obtained with the fulcrum knife 18 on the other side of the steelyard or lever. If the gauge now balances about the load knife-edge 19 it is seen that the knife-edges are in their correct setting or alignment if the knife-edges are formed in one piece; whereas if the gauge is now out of balance it will be seen that correction of the knife-edges will require to be made until the gauge will accurately balance upon the same or corresponding protruding knife-edges on both sides of the steelyard or lever.

Claims:—

1. A gauge for determining the distance between the knife-edges or pivots of a steelyard, weighbeam, or other lever, comprising a beam having two oppositely disposed longitudinally extending bearing faces located in the same horizontal plane one of said faces being transversely notched and the other plain, a longitudinally extending rotatable screw mounted in said beam, a weight mounted on said screw and adjusted by the rotation of the screw.

2. A gauge for determining the distance between the knife-edges or pivots of a steelyard, weighbeam, or other lever, said gauge comprising a beam having two oppositely disposed longitudinally extending bearing faces located in the same horizontal plane one of the said faces being transversely notched and the other plain, a longitudinally extending screw mounted in said beam, an adjustable weight mounted on said screw, and a graduated indicating scale engraved on said beam for ascertaining by measurement the amount of the adjustment of said weight.

3. A gauge for determining the distance between the knife-edges or pivots of a steelyard, weighbeam, or other lever, said gauge comprising a beam having two oppositely disposed longitudinally extending bearing surfaces in horizontal alignment one of the said faces being transversely notched and the other plain, a longitudinally extending rotatable screw mounted in said beam, an adjustable weight mounted on said screw, a graduated scale on said beam against which said weight is indicative, and a vernier scale connected to said screw and beam for indicating subdivisions of the said graduated scale.

In testimony whereof, we have signed our names to this specification.

JOHN HOWELL.
ALFRED WILLIAM BROWN.